No. 894,891. PATENTED AUG. 4, 1908.
F. H. KNAPP & C. W. BLACKSTONE.
LABELING MACHINE.
APPLICATION FILED JAN. 23, 1906.

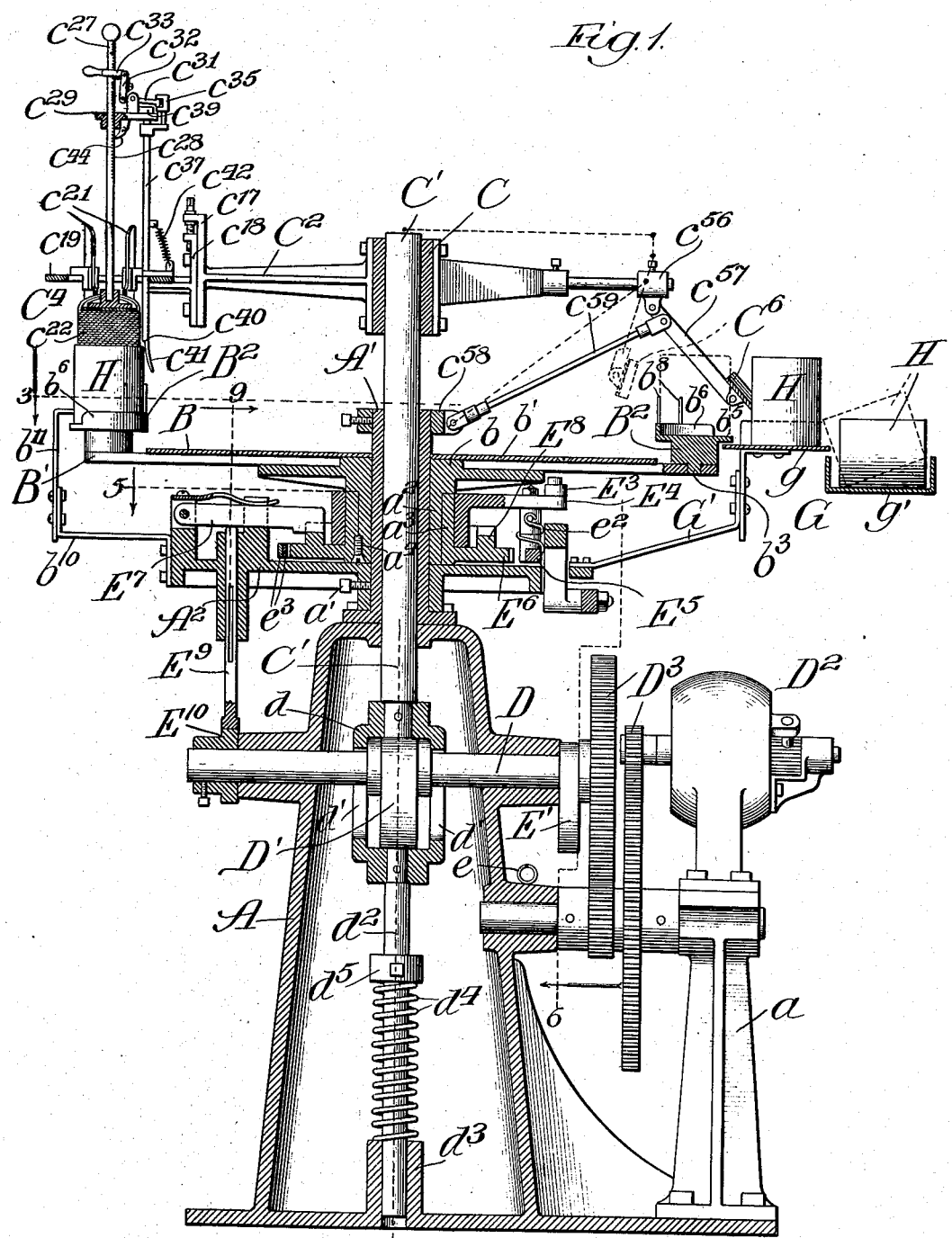

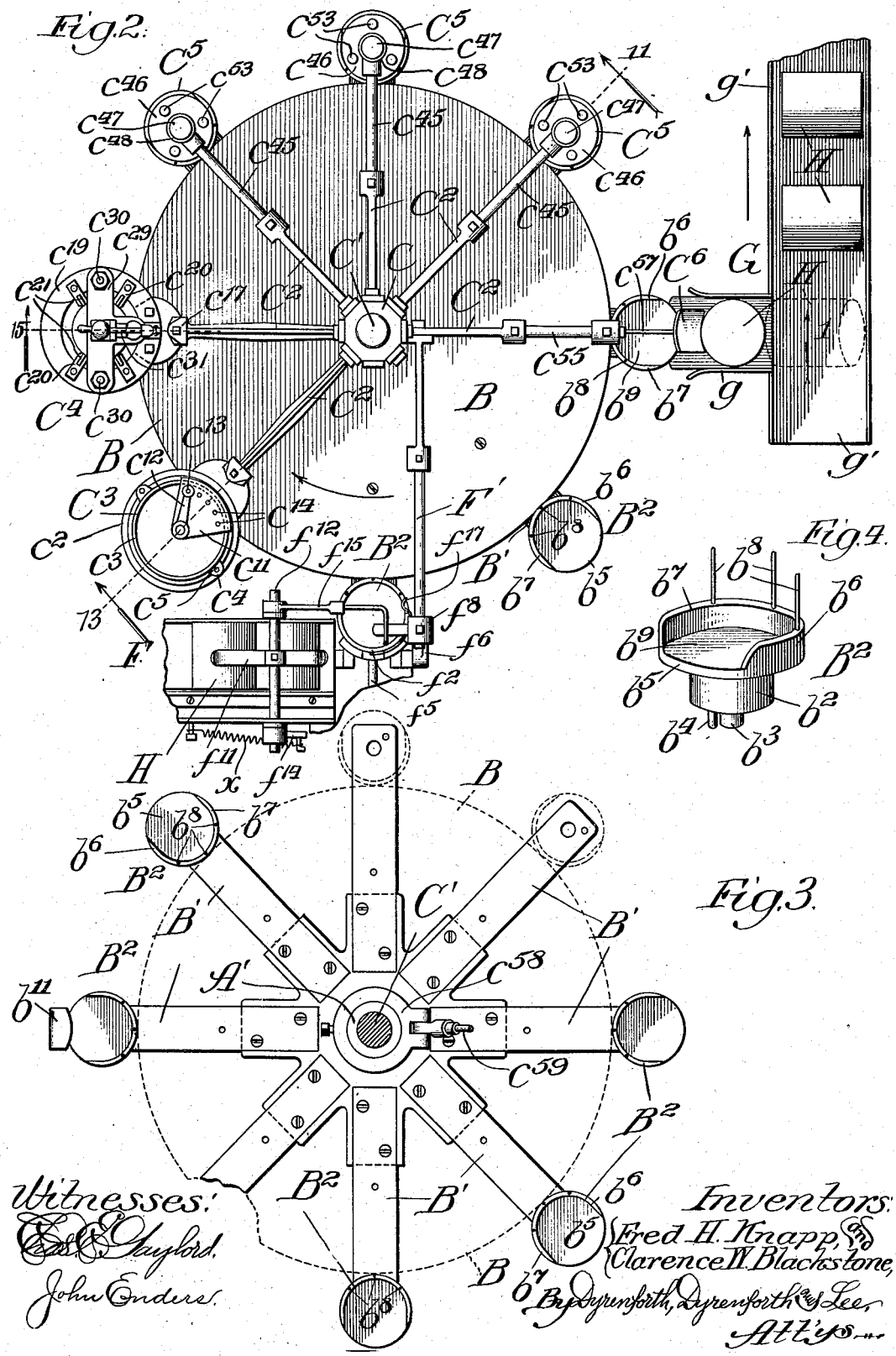

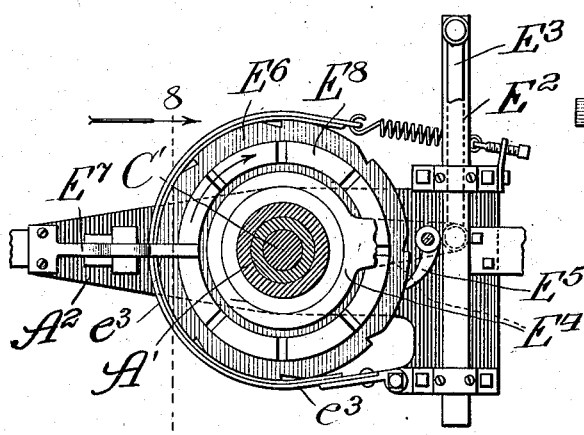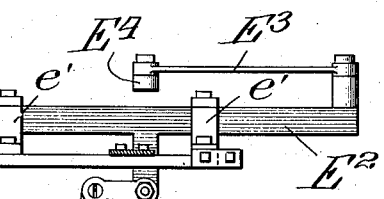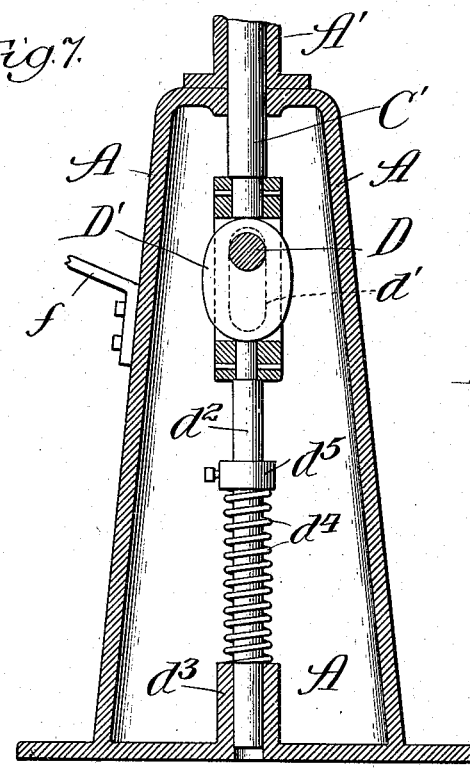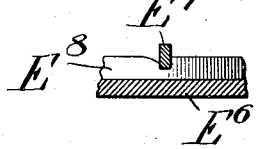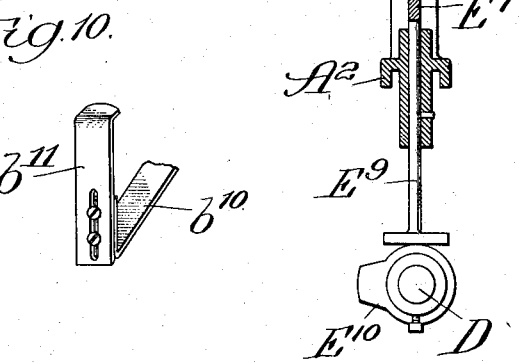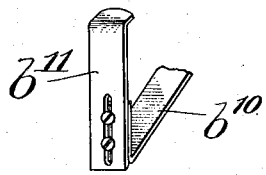

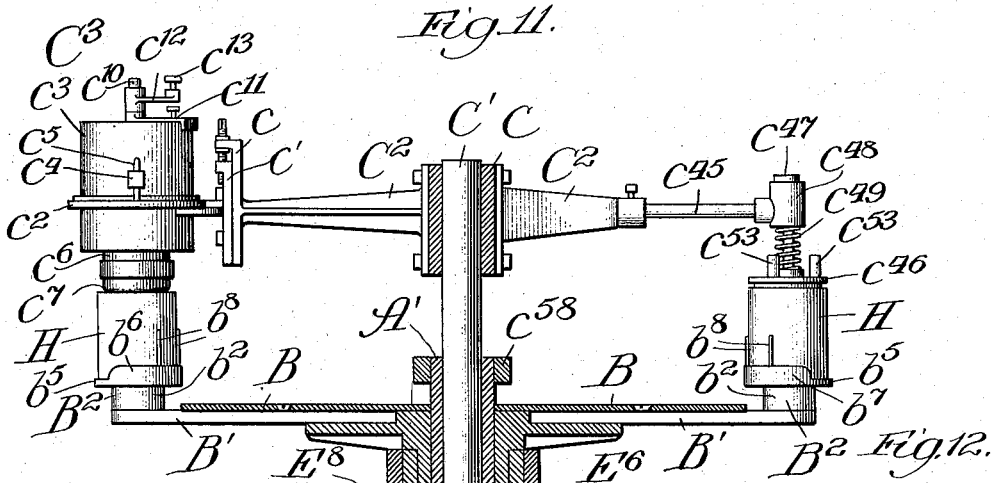

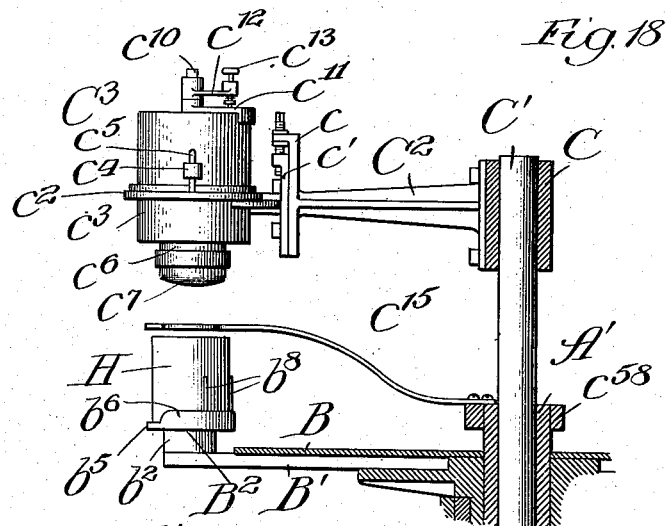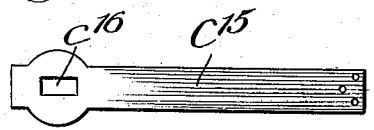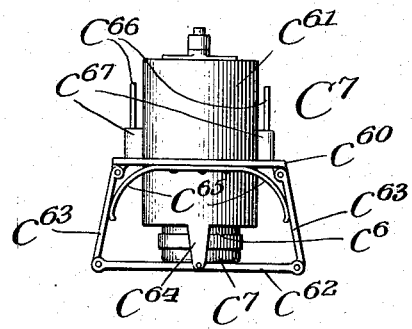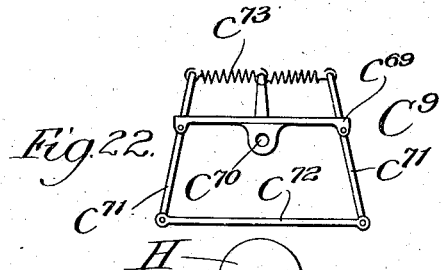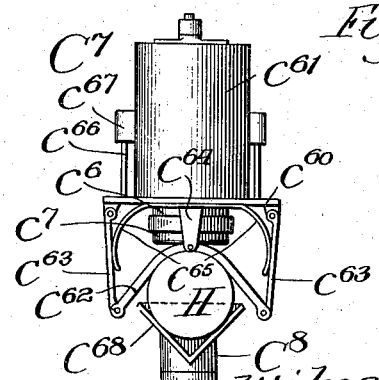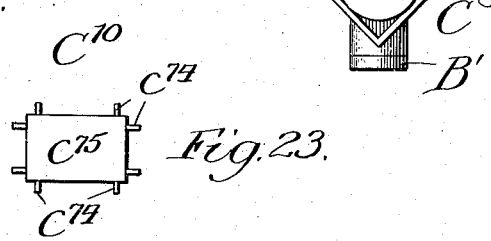

7 SHEETS—SHEET 6.

Witnesses:

Inventors:
Fred H. Knapp, and
Clarence W. Blackstone,
By Dyrenforth, Dyrenforth & Lee,
Att'ys

UNITED STATES PATENT OFFICE.

FRED H. KNAPP AND CLARENCE W. BLACKSTONE, OF CHICAGO, ILLINOIS, ASSIGNORS TO THE FRED H. KNAPP COMPANY, OF CHICAGO, ILLINOIS, A CORPORATION OF ILLINOIS.

LABELING-MACHINE.

No. 894,891.     Specification of Letters Patent.     Patented Aug. 4, 1908.

Application filed January 23, 1906. Serial No. 297,436.

*To all whom it may concern:*

Be it known that we, FRED H. KNAPP and CLARENCE W. BLACKSTONE, citizens of the United States, residing at Chicago, in the county of Cook and State of Illinois, have invented a new and useful Improvement in Labeling-Machines, of which the following is a specification.

Our invention relates particularly to machines for labeling cans, jars, bottles, packages and the like; and our primary object is to provide a machine of improved general construction characterized by large capacity of output and interchangeability of parts, adapting the same machine for use with different styles and sizes of packages.

The invention is illustrated in its preferred embodiment in the accompanying drawings, in which—

Figure 24:
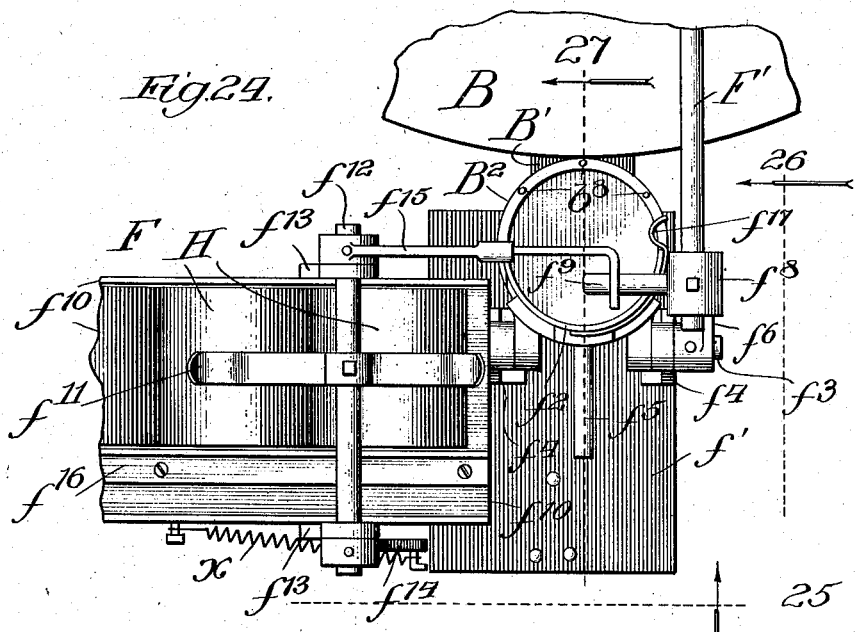
Figure 25:
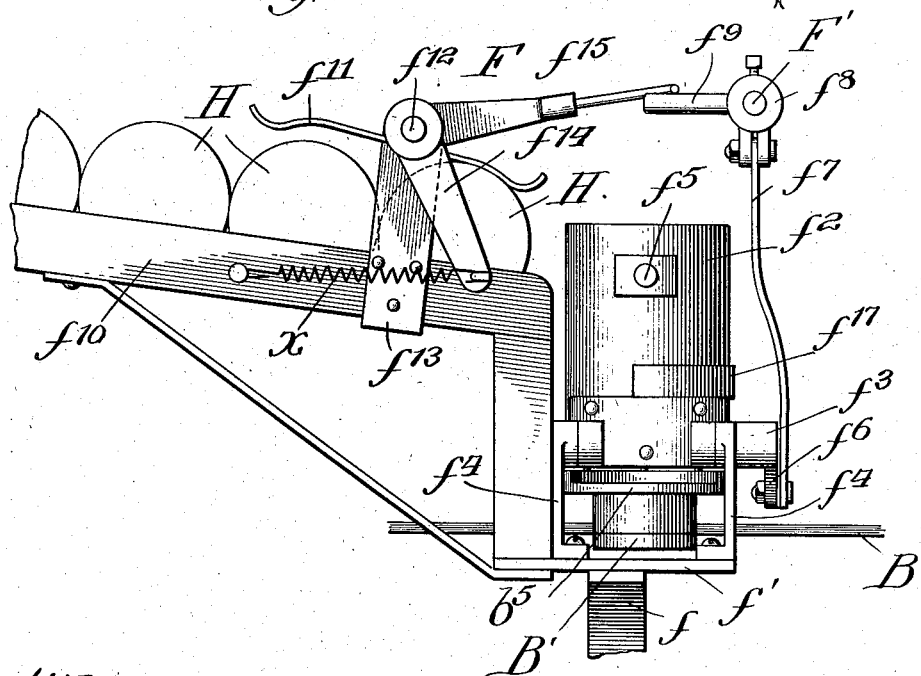
Figure 26:
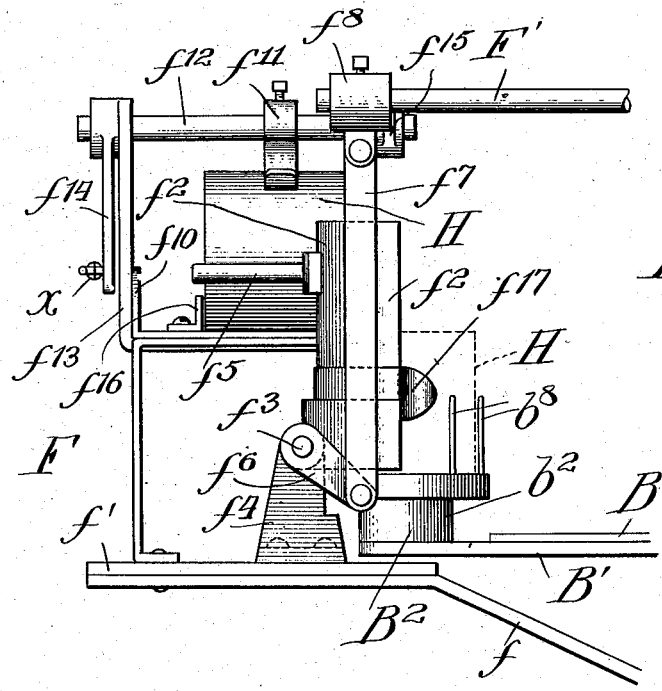

Figure 1 represents a vertical sectional view of our improved labeling machine; Fig. 2, a broken plan view of the same; Fig. 3, a horizontal section taken as indicated at line 3 of Fig. 1; Fig. 4, a detached view of a holder for cans or packages; Fig. 5, a horizontal section taken as indicated at line 5 of Fig. 1 and showing the means for rotating and controlling an intermittently actuated rotary-carrier, or table; Fig. 6, a vertical section taken as indicated at line 6 of Fig. 1, and showing another view of the portion of the mechanism shown in Fig. 5; Fig. 7, a broken vertical section taken as indicated at line 7 of Fig. 1 and showing the means for raising and lowering the device which carries the paste-pot, the label holder, the presses and the package ejector; Fig. 8, a broken section taken as indicated at line 8 of Fig. 5 and illustrating a lock for the rotary-carrier; Fig. 9, a vertical section taken as indicated at line 9 of Fig. 1 and showing the means for releasing said lock; Fig. 10, a perspective view of a device co-acting with the rotary-carrier and aiding in maintaining the can or package in proper position as it is operated upon; Fig. 11, a vertical section taken as indicated at line 11 of Fig. 2, and showing in elevation the paste-pot and one of the presses; Fig. 12, a broken sectional view showing a detail of one of the presses; Fig. 13, a sectional view of the paste-pot taken as indicated at line 13 of Fig. 2; Fig. 14, a horizontal section taken as indicated at line 14 of Fig. 13; Fig. 15, a broken vertical section showing details of construction of the label-holder, the section being taken as indicated at line 15 of Fig. 2; Fig. 16, a broken elevational view of the label-holder; Fig. 17, a broken sectional view of one of the label-holding arms, or standards, of the label-holder; Fig. 18, a broken vertical section showing the relation of the paste-pot, the rotary-carrier, a can carried thereby, and a stencil interposed between the paste-pot and can; Fig. 19, a plan view of the stencil shown in Fig. 18; Fig. 20, an elevational view of a modified form of paste-pot; Fig. 21, an elevational view showing the device shown in Fig. 20 with the parts in another position and the relation thereto of a modified form of can-support and a can carried thereby; Fig. 22, a view showing a modified form of press and the relation thereto of a can and can-support; Fig. 23, a horizontal sectional view showing a modified form of label-holder; Fig. 24, a broken plan view showing on an enlarged scale the package-feeding mechanism shown in Fig. 2; Fig. 25, an elevational view of the mechanism shown in Fig. 24, the view being towards the center of the machine, as indicated at line 25 of Fig. 24; Fig. 26, an elevational view of the same mechanism, the view being substantially tangential to the rotary-carrier as indicated at line 26 of Fig. 24; and Fig. 27, a broken vertical section taken as indicated at line 27 of Fig. 24, but showing the parts in a different position from that in which they are shown in Fig. 24.

A description of the preferred construction is as follows: A represents a hollow frame equipped at its upper end with a vertical tubular standard $A^1$ to the lower portion of which is affixed a stationary disk or frame-member $A^2$; B, a disk-form rotary-carrier journaled on the tubular standard $A^1$ and equipped with radial arms $B^1$ carrying removable package-holders $B^2$; C, a spider secured to the upper end of a reciprocable vertical shaft $C^1$ which extends through the standard $A^1$, said spider having arms $C^2$ carrying (as shown in Fig. 2) a paste-pot $C^3$, a label-holder $C^4$, presses $C^5$ and a package-ejector $C^6$; D, a horizontal shaft equipped within the hollow frame with a cam $D^1$ serving to actuate the shaft $C^1$; $D^2$, a motor connected by gears $D^3$ to the shaft D; E, a cam-arm actuated by the cam $E^1$ on the shaft D and serving to actuate a slide $E^2$ (Figs. 5 and 6) joined by a link $E^3$ to an oscillating arm $E^4$ carrying a pawl $E^5$ which works upon a wheel $E^6$ connected with a hub $b$ of the rotary-carrier B; $E^7$, a locking pawl working upon an upwardly presented ratchet-wheel $E^8$ formed integrally with the wheel $E^6$; $E^9$, a vertical plunger actuated by a cam $E^{10}$ (Figs. 1 and 9) connected with the adjacent end of the shaft D, said plunger serving to raise the locking pawl $E^7$ intermittently to permit the carrier B to rotate; F, feed mechanism actuated by an arm $F^1$ carried by the spider C; and G, a discharge chute supported on a bracket $G^1$ projecting from the frame-member $A^2$.

The frame A may be of any suitable construction. Preferably it is of the hollow standard type shown, and provided at its base with a lateral extension carrying a standard $a$ supporting the motor. The sleeve $A^1$ is flanged at its lower end and bolted to the upper end of the main frame, and the frame-member, or stationary disk, $A^2$ is provided with a central hub which fits over the sleeve $A^1$ and is firmly secured to the lower portion of the sleeve by a set screw $a^1$. The hub $b$ of the carrier B has a downwardly extending sleeve $a^2$ which rests upon the disk $A^2$ and is surrounded by a sleeve $a^3$ forming a portion of the hub of the wheel $E^6$. Said sleeves are keyed together by screws $a^4$, so that the carrier B will rotate with the wheel $E^6$.

The construction of the carrier B may be varied. Preferably the carrier comprises a sheet-metal disk $b^1$, the hub $b$ supporting the same, the arms $B^1$ secured to the disk and capable of a certain amount of yielding, and the holders $B^2$ mounted on the outer extremities of the arms. One of said holders is shown in perspective in Fig. 4. It comprises a hub-portion $b^2$ adapted to rest on the extremity of the arm and equipped with a downwardly projecting tenon $b^3$ adapted to fit in a socket with which the arm is provided, as shown in section in Fig. 1; a pin $b^4$ near said tenon and adapted to enter a perforation in the arm to prevent rotation of the holder; a disk $b^5$ surmounting the hub-portion $b^2$ and equipped with a partial circumferential upturned flange $b^6$; and upwardly extending studs $b^8$ carried by the flange $b^6$. As thus constructed, the holder has a socket $b^9$ for receiving a can, said socket being open at the top and at the outer side. The holder illustrated is for use in connection with cans having slight flanges at the top and bottom, but the holder may be removed and replaced by another holder adapted for use with any kind of a package.

The frame-member $A^2$ is equipped, in the manner shown in Fig. 1, with arms $b^{10}$ supporting upwardly projecting package-engaging fingers $b^{11}$. These fingers are positioned to correspond with the position of the packages while they are being operated upon by the paste-supplying device, the label-supplying device and the presses, the fingers coacting with the holders $B^2$ in the manner clearly shown in Fig. 1.

The spider C comprises simply a hub-portion with the radial arms $C^2$ carried thereby. The arm which carries the paste-pot $C^3$ is equipped at its outer end with a guide $c$ with which is removably and adjustably connected a vertical slide $c^1$, as shown in Fig. 11. The slide $c^1$ is equipped with a ring $c^2$ which encircles the pot $c^3$ which contains the paste. The pot $c^3$ is equipped with perforate lugs $c^4$ which engage pins $c^5$ carried by the ring $c^2$. The paste-pot is provided with a downward extension $c^6$ equipped with a pad $c^7$. The extension is provided with channels $c^8$, as shown in Figs. 13 and 14, through which paste may pass to the pad. The discharge is regulated by a valve $c^9$ actuated by a vertical shaft $c^{10}$ whose upper end is journaled in the segment $c^{11}$ applied to the top of the paste-pot, said shaft being equipped with an arm $c^{12}$ provided with a locking pin $c^{13}$ adapted to engage any desired one of a series of perforations $c^{14}$ with which the segment $c^{11}$ is provided, as shown in Fig. 2. When the shaft $C^1$ is depressed by its cam, the paste-pot is carried down with it until the pad encounters the can, when further movement of the supporting arm of the paste-pot may take place while the paste-pot remains stationary. Where it is desired to limit the area of paste applied to the can, the sleeve $A^1$ may be equipped with a yielding stencil $c^{15}$, as shown in Figs. 18 and 19. The outer end of this stencil is provided with an opening $c^{16}$ through which the pad may be pressed to encounter the surface of the can, the stencil yielding under the weight of the paste-pot, as will be understood from Fig. 18.

Referring now to Figs. 1, 2, 15 and 16, the arm $C^2$ which carries the label-holder $C^4$ is equipped at its outer end with a vertical guide $c^{17}$ with which is removably and adjustably connected a slide $c^{18}$ carrying a ring $c^{19}$. The ring $c^{19}$ is provided with a series of inwardly extending arms $c^{20}$ which support a series of vertical guide-fingers $c^{21}$ between which the labels $c^{22}$ are confined. The lower ends of the guides $c^{21}$, and the lower end of each guide is provided with a vertical slot $c^{24}$ in which is located a spring $c^{25}$ having an incurved lower end adapted to engage the lowermost label. Between the guides $c^{21}$ is located a label-follower $c^{26}$ attached to the lower end of a rod $c^{27}$ one of whose sides is provided with a series of upwardly pointed ratchet-teeth $c^{28}$. A cross-member $c^{29}$ supported on standards $c^{30}$ rising from the ring $c^{19}$, as shown in Fig. 2, forms a guide for the upper portion of the bar, or rod, $c^{27}$. Upon the cross-member $c^{29}$ is fulcrumed, as shown in Fig. 15, a lever $c^{31}$ joined by a link $c^{32}$ to an actuating pawl $c^{33}$ having a slot which receives the bar $c^{27}$ and provided at one end of said slot with a tooth $c^{34}$ engaging the ratchet-teeth $c^{28}$. The lever $c^{31}$ is actuated by a yoke $c^{35}$ carried by an arm $c^{36}$ rigidly secured on a vertically reciprocable bar $c^{37}$. The bar $c^{37}$ has a reduced upper end-portion $c^{38}$ passing through a guide with which the cross-member $c^{29}$ is provided, and a collar $c^{39}$ serves to limit the downward movement of the bar $c^{37}$ with relation to said cross-member. The intermediate portion of the bar $c^{37}$ passes through a guide at the ring $c^{19}$, and the lower portion of the bar $c^{37}$ is equipped with a can-engaging shoulder $c^{40}$, below which is an outwardly curved finger $c^{41}$. The bar $c^{37}$ is normally held in its depressed position by a spring $c^{42}$, as shown in Fig. 1. As shown in Fig. 15, the cross-member $c^{29}$ is equipped with a spring-held member $c^{43}$ engaging the bar $c^{27}$, and said cross-member is also equipped with a spring-held pawl $c^{44}$ which engages the teeth $c^{28}$ of the bar $c^{27}$. At each depression of the label-holder, the shoulder $c^{40}$ of the bar $c^{37}$ engages the upper end of the can, thereby actuating the lever $c^{31}$ and forcing the follower $c^{26}$ downwardly through the medium of the bar $c^{27}$. The follower is curved somewhat, as shown in Fig. 16, so that the central portion of the lowermost label will be brought into contact with the gummed upper surface of the can, causing the label to be withdrawn from the springs $c^{25}$ of the guide $c^{21}$ of the label-holder.

The outer ends of the arms $C^2$ which support the presses $C^5$ are equipped with sockets which removably receive rods $c^{45}$ whose outer ends carry the presses. As shown in Figs. 11 and 12, each press comprises a disk $c^{46}$ equipped with an upwardly extending stem $c^{47}$ slidably connected with a guide $c^{48}$ carried by the outer end of the rod $c^{45}$; a spring $c^{49}$ confined between the disk and the guide; a lower disk $c^{50}$ attached to the disk $c^{46}$; and a plurality of spring-held plungers, or strippers, $c^{51}$ comprising fingers extending through perforations in the disk and equipped with heads $c^{52}$ working in guide-cylinders $c^{53}$ in which are contained springs $c^{54}$. These strippers tend to prevent the label from adhering to the press when the press is elevated, supposing that some paste should be on the press for any reason.

The arm $C^2$ with which is connected the ejector $C^6$ is equipped with a removable rod $c^{55}$, whose outer end carries a member $c^{56}$ with which is connected a link $c^{57}$ whose free end carries the ejector $C^6$. Connected with the link $c^{57}$ and with a collar $c^{58}$ carried by the upper end of the sleeve $A^1$ is a link $c^{59}$, which operates to withdraw the arm $c^{57}$ to the position indicated by dotted lines in Fig. 1 when the shaft $C^1$ rises, and to extend said arm to the position indicated by full lines in Fig. 1 when the shaft $C^1$ is depressed.

As appears from Figs. 1 and 7, the shaft D is equipped centrally with the cam $D^1$, and the cam $D^1$ works within a hollow cam $d$ with which the shaft $C^1$ is equipped at its lower end. The cam $d$ virtually constitutes a housing for the cam $D^1$ and is provided with slots $d^1$ for the shaft D. Connected with the lower end of the cam $d$ is a shaft $d^2$, whose lower end works in a guide $d^3$ at the base of the frame A. A spring $d^4$ encircles the lower end of the shaft $d^2$ and is confined between the guide $d^3$ and a collar $d^5$ with which the shaft is provided. This spring serves the purpose of a counterweight for the shaft $C^1$ and the spider C and the members carried thereby.

The means for intermittently actuating the carrier B will best be understood by reference to Figs. 1, 5, 6 and 8. The rock-arm E is held in contact with the cam $E^1$ by means of a spring $e$, and serves to actuate the slide $E^2$, which moves in horizontal guides $e^1$. A spring $e^2$, shown in Fig. 1, serves to hold the pawl $E^5$ in engagement with the ratchet-wheel $E^6$. At each reciprocation of the slide, the pawl $E^5$ engages a fresh notch of the ratchet-wheel, so that the carrier B will be moved through a space corresponding with the spacing of the holders $B^2$. The pawl $E^7$ locks the carrier after each actuation, and is raised by means of the plunger $E^9$ after the various operations on the cans have been performed during each interval of retardation of the carrier. A brake-band $e^3$ is applied to the periphery of the wheel $E^6$ to prevent the carrier from moving under its own inertia after its actuation by the pawl $E^5$, so that the carrier will stop at exactly the right point after each actuation.

Figure 27:
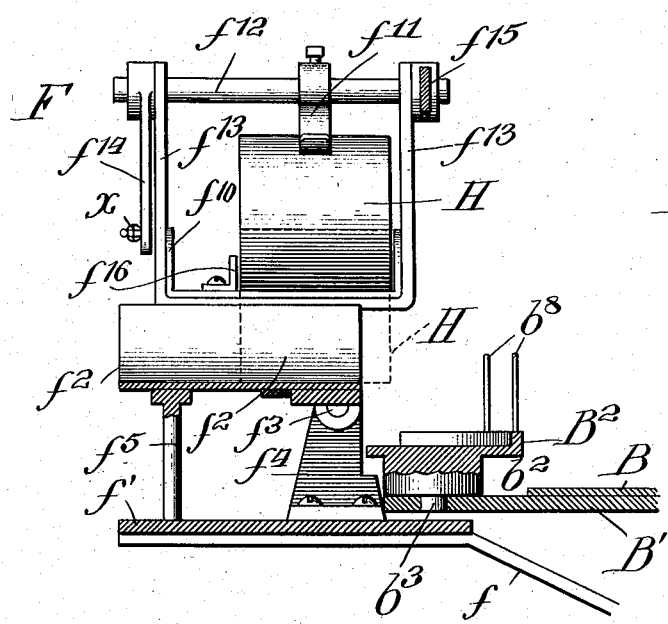

The feed mechanism F will be understood by reference to Figs. 2 and 24 to 27 inclusive. A bracket $f$ extending radially and upwardly from the frame A, as indicated in Figs. 7 and 25, supports a frame $f^1$ upon which is pivoted an open-ended half-cylindrical tilter $f^2$, which normally occupies a radial horizontal position as shown in Fig. 27. The tilter is equipped at its inner ends with trunnions $f^3$ journaled in brackets $f^4$ constituting a portion of the frame $f^1$. The free end of the tilter is equipped with a downwardly extending stud $f^5$ which rests upon the frame $f^1$ when the tilter is in its horizontal position. One of the trunnions $f^3$ is equipped with an arm $f^6$ joined by a link $f^7$ to a member $f^8$ carried by the free end of the arm $F^1$. The member $f^8$ is equipped with a laterally projecting escapement-actuating arm $f^9$. Supported on the frame $f^1$ in a plane at right angles to the tilter $f^2$ and tangentially to the carrier B, is an inclined feed-chute $f^{10}$, the discharge end of which is located slightly above the tilter, when the latter is in its horizontal position. An escapement $f^{11}$ serves to control the discharge of cans H from the feed-chute into the tilter. The escapement $f^{11}$ is carried by a shaft $f^{12}$ journaled in standards $f^{13}$ rising from the sides of the chute $f^{10}$. One end of the shaft $f^{12}$ is equipped with an arm $f^{14}$ with which is connected a spring $x$ which tends to tilt the inner end of the escapement downward, as shown in Fig. 25. The opposite end of the shaft $f^{12}$ is equipped with an actuating arm $f^{15}$ which has a bearing on the arm $f^9$ actuated by the member $F^1$. The chute $f^{10}$ may be of sufficient width to receive the longest can which the machine is capable of operating upon; and, as shown in Fig. 27, a removable angle $f^{16}$ is applied to the bottom of the chute to form one side of the run-way when smaller cans are to be operated upon. The relation of the tilter to the rotating carrier B is clearly shown in Fig. 27, from which view it will be seen that the holder $B^2$ is presented adjacent to and slightly beneath the inner end of the tilter when the carrier stops to permit the label-applying operations to be performed. When the shaft $C^1$ is raised after the label-applying operations, the escapement $f^{11}$ is actuated to permit a can to drop into the tilter $f^2$, and when the shaft $C^1$ is lowered at the next label-applying operation (the carrier being stopped at this instant) the tilter is swung to the vertical position shown in Figs. 24, 25 and 26, thereby standing the can upon end upon the holder $B^2$. The tilter preferably is provided at one side, at or near its inner end, with a spring $f^{17}$, which lightly engages the can to prevent accidental movement thereof.

The discharge chute G comprises a short radial section $g$ and an inclined section $g^1$ at right angles thereto and slightly below the plane of the section $g$, as shown in Figs. 1 and 2. The ejector $C^6$ operates to slide the cans over the section $g$, from which they tip, in the manner illustrated in Fig. 1, into the chute $g^1$, through which they roll on their way to any suitable receptacle.

Thus far, we have described a machine peculiarly adapted for applying labels to the ends of cans. It will be understood, however, that by means of suitable changes in the forms of the various parts, the machine may be adapted for applying labels to packages of any form. In Figs. 20, 21 and 22 we have illustrated modifications in the structure of the paste-applying device and the can-holder, adapting the machine to the work of applying labels to the sides or curved surfaces of cans. In these figures, $C^9$ represents a modified form of paste-applying device; $C^8$, a modified form of holder adapted to be carried by the rotary carrier; and $C^9$, a modified form of press adapted to press the label after it has been applied to the curved surface of the can. Referring now to Figs. 20 and 21, $c^{60}$ represents a ring corresponding with the ring $c^2$ of Fig. 11 and adapted to be applied to the arm $C^2$ shown in Fig. 11. The ring $c^{60}$ receives a paste-pot $c^{61}$ of practically the same construction as the paste-pot shown in Fig. 13. Beneath the pad $c^7$ of the paste-pot $c^{61}$ is arranged a horizontal flexible pad $c^{62}$ whose extremities are joined by links $c^{63}$ to the ring $c^{60}$. The central portion of the pad $c^{62}$ is connected with downwardly extending arms $c^{64}$ carried by the lower end of the pot $c^{61}$. Springs $c^{65}$ tend normally to hold the links $c^{63}$ separated and the pad $c^{62}$ in the extended position shown in Fig. 20. The ring $c^{60}$ is equipped with guide-pins $c^{66}$ upon which fit perforate lugs $c^{67}$ with which the paste-pot is provided. When, during the downward movement of the arm $C^2$, the central portion of the pad $c^{62}$ encounters the uppermost surface of the can, the paste-pot will cease its downward movement while the ring $c^{60}$ will continue its downward movement, thereby bending the pad $c^{62}$ about the curved surface of the can, as illustrated in Fig. 21. Since the pad $c^{62}$ receives a supply of paste from the pad $c^7$, it will be obvious that paste will be applied to the curved surface of the can. The holder $C^8$ is provided with a V-shaped receptacle $c^{68}$ in which the can lies during the operations upon it. The press $C^9$ comprises a member $c^{69}$ equipped with an arm $c^{70}$ adapted to replace the arm $c^{45}$ shown in Fig. 2. The member $c^{69}$ is equipped with plates or levers $c^{71}$, whose lower ends are joined by a flexible member $c^{72}$ adapted to conform to the shape of a can, and whose upper ends are joined by springs $c^{73}$ which yield to permit movement of the levers $c^{71}$. It is obvious that when the press is lowered, the member $c^{72}$ will be curved about the can in the same manner as the pad $c^{62}$ is curved thereabout in Fig. 21.

In Fig. 23 is shown a modification of the label-holder $C^4$. A modified form of label-holder is designated $C^{10}$. Its construction is similar to the construction of the holder $C^4$ shown in detail in Fig. 16, except that the guides $c^{21}$ are replaced by guides $c^{74}$ arranged to receive a square label $c^{75}$ between them. Of course, the label-follower would be suitably modified in form for use in connection with square labels.

The operation of the improved labeling-machine may be stated briefly. The carrier B upon which are mounted the can-holders $B^2$ is intermittently rotated through the medium of the mechanism illustrated in Figs. 5 and 6. During the periods of retardation, the carrier is locked against accidental movement by the locking pawl $E^7$. The shaft D rotates continuously and actuates the carrier B intermittently in the manner described. The shaft D likewise reciprocates the shaft $C^1$ upon which are mounted the paste device, the label-applying device, the presses and the arm $F^1$ which actuates the feed mechanism. Each time the shaft $C^1$ rises, the tilter $f^2$ of the feed mechanism is depressed to the horizontal position to receive a can, and the escapement is actuated to permit a can to drop into the tilter; and when the shaft C¹ falls again, the escapement returns to engage the succeeding can while the tilter is thrown to a vertical position to discharge the can into the adjacent holder of the rotary-carrier. When the machine is in full operation, a can is undergoing treatment at the paste-applying device, the label-applying device, each one of the presses and the ejector. Should the presses in any manner get paste upon them, the strippers shown in Figs. 11 and 12 will operate to prevent the labels from adhering to the presses.

Experience has demonstrated that a labeling-machine constructed upon the principle herein described can be operated at a high rate of speed, and that the capacity of the machine is very greatly superior to the capacity of any known construction for the same class of work. Moreover, the parts are readily interchangeable, so that the same machine can be employed for various sized packages of a given form and for varying forms of packages. This is a feature of great importance, inasmuch as it renders it unnecessary for the consumer to purchase several machines for different kinds of work and renders it unnecessary for the manufacturer to keep on hand an excessive stock of machines.

It is to be understood that the foregoing detailed description has been given for clearness of understanding only and that no unnecessary limitation is to be implied therefrom.

What we regard as new, and desire to secure by Letters Patent, is—

1. In a labeling-machine, the combination of an intermittently-actuated carrier equipped with a plurality of package-holders moving in an endless path, a reciprocating shaft extending centrally through the carrier at right angles to the plane thereof, and a paste-applying device and a label-applying device carried by said shaft, for the purpose set forth.

2. In a labeling-machine, the combination of an intermittently-actuated rotary carrier equipped with a plurality of package-holders arranged in a circle, a reciprocating shaft having its axis concentric with the axis of said carrier, and a label-applying device carried by said shaft and located above the path of said package-holders, for the purpose set forth.

3. In a labeling-machine, the combination of a reciprocable vertical shaft, label-applying devices carried thereby, a rotatable carrier journaled about said shaft, and a shaft at right angles to said first-named shaft equipped with means for reciprocating said first-named shaft and intermittently actuating said carrier, for the purpose set forth.

4. In a labeling-machine, the combination of an intermittently-actuated horizontally-disposed rotary carrier disk equipped with a plurality of package-holders, a brake for the carrier, an intermittently-released lock for the carrier, and reciprocating means located above the carrier for applying labels to the packages, for the purpose set forth.

5. In a labeling-machine the combination of a rotary carrier equipped with a plurality of package-holders arranged in a circle, a reciprocating member equipped with label-applying means, package-feeding mechanism actuated by said reciprocating member, and package-ejecting mechanism actuated by said reciprocating member, for the purpose set forth.

6. In a labeling-machine, the combination of a rotary carrier equipped with a plurality of package-holders, a ratchet-wheel located beneath and serving to actuate said carrier, an intermittently actuated pawl serving to actuate said ratchet-wheel, a vertical reciprocating shaft projecting above said carrier, and label-applying means carried by said shaft and located above the path of the package-holders, for the purpose set forth.

7. In a labeling machine, the combination of an intermittently actuated carrier equipped with a plurality of package-holders, label-applying means, and package-feeding means comprising a tilter located adjacent to and above the path of the package-holders, a chute above said tilter arranged to discharge packages by gravity directly into the tilter when in horizontal position, means for tilting the tilter, and an escapement controlling the discharge of the packages from the said chute to said tilter, for the purpose set forth.

8. In a labeling-machine, the combination of an intermittently actuated carrier equipped with a plurality of package-holders, label-applying means, and package-feeding means comprising an inclined chute for receiving packages, a tilter located adjacent to and above the path of the package-holders and below and adjacent to the discharge portion of the chute, the axis of the tilter being substantially parallel with the chute, whereby articles discharged from the chute will drop into the tilter by gravity, and an escapement controlling the discharge of the packages from the chute to the tilter, for the purpose set forth.

9. In a labeling machine, the combination of a horizontally disposed rotary carrier equipped with a plurality of package-holders, label-applying means located adjacent to the path of the package-helders, a radially disposed tilter located adjacent to and above the path of the package-holders, means for actuating the tilter, and a feed-chute disposed substantially at right angles to the tilter and above it, and arranged to discharge packages by gravity directly into the tilter when the latter is in horizontal position, for the purpose set forth.

10. In a labeling machine, the combination of an intermittently-actuated carrier occupying a horizontal plane and equipped with a plurality of package-holders moving in an endless path, said package-holders being open at their tops and outer sides, stationary means co-acting with said package-holders at a point of retardation of the package-holders to maintain the packages in proper position, and reciprocating label-applying means, for the purpose set forth.

11. In a labeling-machine, the combination of an intermittently-actuated carrier equipped with a plurality of package-holders, a reciprocating member equipped with a paste-pot having a discharge at its lower end, and a stencil co-acting with said paste-pot, for the purpose set forth.

12. In a labeling-machine, the combination of a horizontally-disposed intermittently-actuated carrier equipped with a plurality of package-holders, a reciprocating member, a paste-pot carried thereby and provided at its lower end with a pad, and an adjustable valve controlling the discharge from the paste-pot to the pad, for the purpose set forth.

13. In a labeling-machine, the combination with a package-carrier of a vertically-disposed label-holder, a follower therefor provided with an upwardly projecting stem, and package-engaging means equipped with means for depressing said follower through the medium of its stem, for the purpose set forth.

14. In a labeling-machine, the combination with a package-carrier, of a vertically-disposed label-holder equipped at its lower end with means for engaging the peripheries of the labels, a label-follower equipped with an upwardly projecting stem, and a member serving to actuate said follower through the medium of its stem and equipped at its lower end adjacent to the labels with a package-engaging shoulder, for the purpose set forth.

15. In a labeling-machine, the combination with a package-carrier, of a label-feeding device comprising a label-holder equipped at its lower end with means for engaging the edges of the labels, a depressible follower having an upwardly projecting stem, a pawl engaging said stem, and actuating means for said pawl including a bar equipped at its lower end with a package-engaging shoulder, for the purpose set forth.

16. In a labeling-machine, the combination with a package-carrier, of a label-feeding device comprising vertical guide-members for receiving the labels between them, said members being equipped at their lower ends with teeth, a follower between said guides equipped with an upwardly projecting stem, a bar parallel with said stem and provided at its lower end with a package-engaging shoulder, a lever actuated by said bar, and a pawl actuated by said lever, for the purpose set forth.

17. In a labeling-machine, the combination with a package-carrier, of a label-feeding device comprising vertical guide-members for receiving the labels between them, said members being equipped at their lower ends with teeth, a follower between said guides equipped with an upwardly projecting stem, a bar parallel with said stem and provided at its lower end with a package-engaging shoulder, a lever actuated by said bar, a pawl actuated by said lever, and a pawl supported on a stationary pivot and engaging the stem of said follower.

18. In a labeling-machine, the combination with a package-carrier, of a vertically-disposed label-holder, a follower therein equipped with an upwardly projecting stem, a bar parallel with said stem and equipped at its lower end with a package-engaging shoulder, a pawl actuated by said bar and serving to actuate said follower through the medium of its stem, and a spring-held member frictionally engaging the stem of said follower, for the purpose set forth.

19. In a labeling-machine, the combination of an intermittently-actuated rotary carrier equipped with a plurality of package-holders, and a label-applying device comprising a vertically disposed label-holder located above the path of the package-holders, a vertically movable follower, and actuating means for said follower extending to a point near the bottom of the label-holder and adapted to engage a package, for the purpose set forth.

20. In a labeling-machine, the combination of a rotary carrier equipped about its circumferences with sockets and package-holders removably mounted in the sockets, for the purpose set forth.

21. In a labeling-machine, the combination of a carrier equipped with a plurality of package-holders, a reciprocating member provided with a guide, a paste-pot-supporting-ring carrying a slide adjustably connected with the guide and a label-applying device carried by the reciprocating member.

22. In a labeling-machine, the combination of a carrier equipped with a plurality of package-holders, a reciprocating member provided with a paste-applying device and containing a socket and a press mounted on a rod adjustably confined in said socket, for the purpose set forth.

FRED H. KNAPP.
CLARENCE W. BLACKSTONE.

In presence of—
L. HEISLAR,
J. H. LANDES.